United States Patent Office 3,213,062
Patented Oct. 19, 1965

3,213,062
FLUORINATION OF CARBONYL COMPOUNDS WITH CARBONYL FLUORIDE AND SELECTED PRODUCTS MADE THEREBY
Ellsworth K. Ellingboe, Frank S. Fawcett, and Charles W. Tullock, Wilmington, Del., assignors to E. I. du Pont de Nemours and Company, Wilmington, Del., a corporation of Delaware
No Drawing. Filed Nov. 16, 1959, Ser. No. 852,939
21 Claims. (Cl. 260—63)

This invention relates to, and has as its principal objects provision of, a new process for preparing fluorine-containing organic compounds and selected chemical compounds made thereby.

A process has now been found for producing fluorine-containing organic compounds wherein carbonyl fluoride,

is reacted with an organic compound which contains an oxygen atom doubly bonded to a carbon, which carbon is further joined by single bonds to two atoms of which at most one is halogen and at most one is oxygen. The process, therefore, consists in reacting carbonyl fluoride with an organic compound which contains a carbonyl group, i.e., a >C=O group, in which group two of the valences of the carbon are satisfied by singly bonded atoms of which at most one is halogen and at most one is oxygen. The compounds which are reacted with carbonyl fluoride are referred to hereinafter as carbonyl compounds. The carbonyl compound include organic oxo-carbonylic compounds and organic non-oxo-carbonylic compounds.

In a preferred form of the invention, carbonyl fluoride is reacted with an organic compound containing an oxygen doubly bonded to a carbon, which carbon is further singly bonded to at least one carbon and at most one hydrogen, halogen or element of atomic number of 7–8, inclusive, i.e., nitrogen or oxygen.

Typical classes of carbonyl compounds which are operable in the process, with specific examples in parentheses, are the oxo or oxo-carbonylic compounds, ketones (acetone), and aldehydes (benzaldehyde), and organic non-oxo-carbonylic compounds such as organic acids (benzoic acid), organic anhydrides (phthalic anhydride), acyl halides (benzoyl chloride), amides (N,N-dimethylbenzamide), esters (methyl benzoate), salts of organic acids (potassium oxalate), and ureas (tetramethylurea).

The mechanism of the reaction is not clearly understood, but, in general, the final result is the replacement of the oxygen of the carbonyl group with two fluorine atoms. The ultimate reaction product is, therefore, an organic compound containing a —CF₂— group. However, intermediate products can be and frequently are obtained. These products include acyl fluorides and esters and amides of fluoroformic acid.

With aldehydes or ketones, e.g., with cyclohexanone, a novel class of intermediate products can be obtained which are esters of fluoroformic acid (also called fluorocarbonic acid). The novel compounds are represented by the general formula

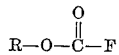

where R is an organic group bonded through a fluorine-bearing carbon to the oxygen. This type of compound is an addition product of one mole of the carbonyl reactant with one mole of carbonyl fluoride. This intermediate product, the ester of fluoroformic acid, is discussed more fully in subsequent paragraphs.

Treatment of carboxylic acids, their anhydrides or their esters with carbonyl fluoride may yield products in which all of the oxygens are replaced or in which only the hydroxyl group, anhydride oxygen or the hydrocarbyloxy group is replaced. Replacement of all of the oxygens yields compounds bearing trifluoromethyl groups. Replacement of the hydroxyl, the anhydride oxygen or the hydrocarbyloxy group yields acyl fluorides.

Normally two fluorine atoms are introduced into carbonyl compounds in which both residual bonds of the carbon of the carbonyl group are attached to carbon. Two fluorine atoms are also introduced into the compound if one of the residual bonds of the carbon in the carbonyl group is attached to carbon and one to hydrogen or a tertiary nitrogen atom. Generally, products containing either three fluorine atoms or an acyl fluoride group are obtained if one bond of the carbon of the carbonyl group in the reactant is attached to halogen (other than fluorine), oxygen or primary or secondary nitrogen, although compounds containing a CF₂ group may also be formed. Thus, while two fluorine atoms are introduced into a compound such as benzophenone, three may be introduced into compounds such as benzoyl chloride, methyl benzoate and benzamide. Compounds bearing acyl fluoride groups may also be formed as intermediate products in these types of reactants. Oxygen which is initially doubly bonded to the carbon of the carbonyl compound is removed as a component of the by-products. The principal by-product in most cases is carbon dioxide, a gaseous compound whose disposal presents no problem. Therefore, a particular advantage of the process of the invention, in addition to complete utilization of the fluorine in the fluorinating agent, is the formation of an unobjectionable and generally harmless by-product.

The reaction of the carbonyl compound with carbonyl fluoride is conducted preferably under substantially anhydrous conditions in a vessel equipped to prevent access of moisture and moist air. The inner surface of the vessel is made of material which is resistant to chemical attack by hydrogen fluoride or other corrosive components of the reaction mixture. Air and any moisture present in the reaction vessel are preferably displaced with a dry, inert gas, e.g., nitrogen, before the reactants are charged into the chamber. The carbonyl compound is conveniently charged into the chamber first and the chamber is cooled and evacuated. The fluorinating agent, carbonyl fluoride, is then added to the cooled chamber. In the event a catalyst is employed, it is generally added with the carbonyl compound to the reaction chamber. The order of addition of reactants, as described above, is not critical and it can be changed as required by circumstances.

The mole ratio of reactants and the conditions chosen for maximum yield of product are determined by the chemical reactivity and thermal stability of the reactants and of the fluorine-containing products formed in the reaction.

The mole ratio of carbonyl fluoride to each carbonyl group in the compound being fluorinated is preferably not less than 1:1 or more than 6:1. With compounds of low chemical reactivity, a considerable excess of carbonyl fluoride is used.

The reaction time in a batch process is generally between about 2 hours and 48 hours. During the reaction period, the contents of the reaction vessel are preferably mixed by conventional means, e.g., by mechanical stirring or shaking.

The reaction can be conducted by a continuous flow process wherein the reactants are fed continuously into a reaction zone which is maintained at a temperature sufficient to effect reaction. Times of contact in a continuous flow process are of relatively short duration, and the fluorinated product is removed continuously as formed.

The pressure employed in the process is not critical. In a batch operation employing a closed vessel, the pressure is generally autogenous and will usually lie between about 5 and 200 atmospheres but pressures outside of this range are operable. In a continuous flow process the pressure may be atmospheric or it may be above or below atmospheric.

The temperature at which the reaction is conducted is determined to some extent by the reactivity of the carbonyl compound. The temperature is kept as low as operability permits, and it generally lies between 0° C. and 700° C. A preferred temperature range is about 20° C. to about 500° C. Aldehydes, ketones and amides generally react readily with carbonyl fluoride at relatively low temperatures, e.g., about 25° C. to about 200° C. However, temperatures outside this range, particularly temperatures above 200° C., can be employed, if desired. Acids, esters, acyl halides and acid anhydrides generally require a relatively high temperature for reaction, e.g., about 175° C. to about 500° C. Heating is, therefore, generally employed for reaction of carbonyl fluoride with the latter classes of carbonyl compounds.

The fluorination process can be conducted advantageously in the presence of catalysts. Three broad classes of catalysts are suitable for use in the process, namely, basic compounds, phosphine oxides and inorganic fluorides.

Basic catalysts which are operable include compounds such as tertiary amines, N,N-dialkylformamides, N,N-dialkylacetamides, and the like. Many amides, which are carbonyl compounds used as reactants, are sufficiently basic in character to serve also as catalysts. Thus, N,N-dimethylformamide or N,N-dimethylacetamide can be used as catalysts for fluorination of non-basic carbonyl reactants or the amides can be used as the carbonyl reactant which is to be fluorinated. Tertiary amines which are useful as catalysts include pyridine, quinoline, trimethylamine, tributylamine, N,N-dimethylaniline, N,N-dipropylaniline, tricyclohexylamine, and the like. The quantity of catalyst employed will generally be from 1 to 20% by weight of the carbonyl reactant.

Inorganic fluorides which are useful as catalysts in the process include hydrogen fluoride, sodium fluoride, potassium fluoride, cesium fluoride, rubidium fluoride, tetraalkylammonium fluorides, arsenic trifluoride, phosphorus pentafluoride, boron trifluoride, and silicon tetrafluoride. Use of an inorganic fluoride catalyst is particularly desirable with those carbonyl compounds which, without the catalyst, require high temperatures and long periods of reaction to effect fluorination. Alkali metal fluorides and hydrogen fluoride are preferred catalysts. Compounds which generate hydrogen fluoride under the conditions of the reaction can be substituted therefor.

Phosphine oxides which are useful as catalysts include trimethylphosphine oxide, tributylphosphine oxide, triheptylphosphine oxide, triphenylphosphine oxide, tri(m-chlorophenyl)phosphine oxide, and tribenzylphosphine oxide.

It was stated earlier that an intermediate reaction product can be formed which, in the case of aldehydes and ketones, is an ester of fluoroformic acid. By conducting the reaction at a moderate temperature, e.g., 25–100° C., the intermediate reaction product may be obtained. This product is a fluorinated ester of fluoroformic acid in which the organic group R in the formula

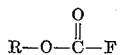

bears a fluorine on the carbon bonded to the oxygen. The intermediate product can be isolated from the reaction mixture by conventional methods. It can then be heated, preferably in the presence of a catalyst of the types described earlier, until carbon dioxide is released. There is thus obtained a final reaction product having a —$CF_2$— group in its structure.

The process of the reaction can, therefore, be conducted in two steps, as described above, or it can be performed in one step by heating the mixture to a temperature sufficient to release carbon dioxide as a by-product.

The carbonyl compounds employed as reactants are generally known compounds which are available commercially. The compounds need not be specially purified prior to use, and materials of commercial grade are satisfactory. The materials can, if desired, be dried before use to free them of adventitious moisture.

Carbonyl fluoride can be prepared by methods described in the literature. [See, for example, Ruff and Miltschitzky, Z. anorg. Chem. 221, 154 (1934); Emeleus and Wood, J. Chem. Soc. 1948, 2185; U.S. 2,836,622.]

Isolation and purification of the fluorinated product after completion of the reaction is accomplished by well-recognized procedures. A preferred method consists in pouring the crude reaction products into an inert solvent containing a hydrogen fluoride acceptor, e.g., an alkali or alkaline earth metal fluoride, agitating, filtering, removing the solvent, and distilling the fluorinated compound. Alternatively, the crude reaction product can be stored for a period of time under reduced pressure in the presence of an acid acceptor and then distilled. If hydrogen fluoride is not used as a catalyst or is not formed as a by-product, the preliminary purification steps are not necessary; the product is separated from the crude reaction mixture by distillation or crystallization.

Various modifications can be made in the process described. Thus, inert solvents can be used to dissolve solid reactants and to modify the vigor of the reaction where highly reactive chemicals are used. Suitable solvents are benzene, pentane, hexane, octane, cyclohexane, and perfluorinated compounds such as perfluorocyclohexane.

The reaction tube can be purged by any chemically inert gas to remove substantially all the oxygen from the tube. The lining of the reaction tube can be any material that is not attacked by fluorine or hydrogen fluoride under the conditions of the reaction. The various stainless steels, nickel, nickel alloys, platinum, and platinum alloys are useful for this purpose.

The operation of the invention is illustrated in the following examples in which quantities of reactants (parts) and percentages are given in terms of weight. Pressures are in millimeters of mercury unless otherwise noted.

EXAMPLE I

A. Preparation of 1-fluorocyclohexyl fluoroformate

A pressure vessel (capacity, 240 parts of water) which is lined with a corrosion-resistant steel is flushed with nitrogen. It is then charged, by the procedure described previously, with 40 parts of cyclohexanone, 65 parts of carbonyl fluoride, and 4–5 parts of dimethylformamide. The dimethylformamide is employed as a catalyst. The vessel is closed, and it is heated with mechanical agitation under autogenous pressure for 12 hours at 50° C. The vessel is cooled, and the volatile reaction products are removed by venting. There remains in the reaction vessel 70 parts of a yellow liquid which is distilled under reduced pressure through a conventional fractionating column to yield 52 parts of a colorless liquid; B.P. 59–63° C./27 mm. The major portion of this material (47.1 parts) boils at 63–64° C./27 mm. The colorless liquid is 1-fluorocyclohexyl fluoroformate, a compound with the following structure:

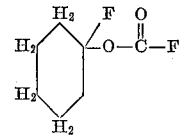

The identity of the compound is confirmed by its nuclear magnetic resonance and infrared absorption spectra and by elemental analysis.

*Analysis.*—Calcd. for $C_7H_{10}O_2F_2$: F, 23.0. Found: F, 21.99.

A second reaction, conducted as described above, but using half of the stated amounts of each reactant, yielded 21 parts of 1-fluorocyclohexyl fluoroformate.

B. *Preparation of 1,1-difluorocyclohexane*

A glass reaction vessel is employed which is equipped with a mechanical stirrer and a reflux condenser to which is attached a gas bubbler tube to indicate evolution of gas.

The vessel is charged with 17 parts of 1-fluorocyclohexyl fluoroformate, 30–35 parts of hexane, and 4.8 parts of boron trifluoride-etherate. The liquid reaction mixture, which consists principally of one layer with a minor amount of a heavier separate liquid layer, is stirred under reflux with gentle heating. At 45° C. gas evolution begins and continues with mild refluxing. The mixture is heated for 3 hours at a temperature of 45–70° C., and it is then cooled to prevailing atmospheric temperature. The upper liquid layer is separated, and it is agitated with powdered sodium fluoride to remove free hydrogen fluoride which may be present. Sodium fluoride is separated by filtration, and the filtrate is evaporated to remove the solvent. The liquid residue is distilled through an efficient fractionating column to yield 5.6 parts of 1,1-difluorocyclohexane, B.P. 101–107° C.; $n_D^{25}$, 1.3900–1.3895. The identity of the compound is confirmed by nuclear magnetic resonance and infrared spectra and by elemental analysis.

*Analysis.*—Calcd. for $C_6H_{10}F_2$: F, 31.6. Found: F, 31.41.

In a repeat reaction 7 parts of 1-fluorocyclohexyl fluoroformate is heated with 3 parts of boron trifluoride-etherate with no added solvent. The mixture is warmed to 65° C. when gas evolution begins and the temperature rises spontaneously to 85° C. with refluxing of the liquid mixture. The reaction mixture is gently heated to about 100° C. for 10 minutes. It is cooled, extracted with pentane and the pentane extract is agitated with powdered sodium fluoride. There is obtained from this solution, by the process described above, 3 parts of water-white 1,1-difluorocyclohexane, boiling at 97–102° C.; $n_D^{23}$, 1.3909.

*Analysis.*—Calcd. for $C_6H_{10}F_2$: F, 31.6. Found: F, 30.7.

EXAMPLE II

A pressure vessel of the type described in Example I-A is charged with 30 parts of benzonitrile, 30 parts of cyclohexanone, 0.5 part of tetraethylammonium fluoride, and 50 parts of carbonyl fluoride. The reaction mixture is heated at 50° C. for 5 hours and then at 75° C. for 5 hours. The reaction product is worked up as described in Example I-A. There is obtained about 20 parts of 1-fluorocyclohexyl fluoroformate.

From this product 1,1-difluorocyclohexane is obtained by the procedure described in Example I-B.

EXAMPLE III

A. A pressure vessel of the type described in Example I-A is charged with 27 parts of benzophenone, about 2 parts of pyridine and 38 parts of carbonyl fluoride. The mixture is heated under autogenous pressure at 100° C. for 2 hours, at 150° C. for 2 hours and at 200° C. for 10 hours. The vessel is cooled to prevailing atmospheric temperature, and the gaseous reaction products are removed by venting the vessel. There remains 27 parts of a liquid product which is poured with stirring into a slurry of sodium fluoride in pentane. The mixture is filtered, and the filtrate is warmed at steam bath temperatures to remove the solvent. The liquid residue is distilled through an efficient fractionating column to yield 15.53 parts of a colorless liquid, boiling at 118–150° C./8 mm. The liquid is substantially pure difluorodiphenylmethane containing a small quantity of unreacted benzophenone. The identity of the reaction product is confirmed by the nuclear magnetic resonance spectrum which is compared with a standard reference sample of the compound.

B. The above reaction is repeated except that the mixture is heated at 150° C. for 2 hours, at 200° C. for 2 hours, and at 250° C. for 10 hours. There is obtained 19.1 parts of difluorodiphenylmethane, a water-white liquid, boiling at 100–101° C./2.5 mm.; $n_D^{25}$, 1.5360–1.5368. The material is further purified by passing it through silica gel employing ethanol to desorb the product. The refractive index ($n_D^{25}$) of the product thus purified is 1.5348. The identity of the product is confirmed by its nuclear magnetic resonance spectrum and by elemental analysis.

*Analysis.*—Calcd. for $C_{13}H_{10}F_2$: F, 18.63. Found: F, 1858.

C. The reaction as described in part B is repeated except that 2.0 parts of cesium fluoride is used in place of the pyridine. There is obtained 13.53 parts of difluorodiphenylmethane, boiling at 105–110° C./2.5 mm.; $n_D^{25}$, 1.5378–1.5425. The water-white liquid is further purified by chromatographic procedures employing silica gel to yield a product having a refractive index ($n_D^{25}$) of 1.5347.

D. The reaction as described in part B is repeated except that no catalyst is used. Thus, a mixture of 27 parts of benzophenone and 38 parts of carbonyl fluoride is heated at 150° C. for 2 hours, at 200° C. for 2 hours and at 250° C. for 10 hours. There is obtained about 0.5 part of difluorodiphenylmethane which represents about 3% conversion of the benzophenone to the desired product.

Example III, parts A–D, illustrate the improvement in yield of desired products which may be obtained by employing a catalyst in the process.

EXAMPLE IV

A. A pressure vessel (capacity, 240 parts of water) which is lined with a corrosion-resistant steel, is charged with 27 parts of benzaldehyde and 33 parts of carbonyl fluoride. The vessel is closed, and the mixture is heated under autogenous pressure with agitation at 100° C. for 2 hours, and it is then heated slowly over a 2-hour period to 250° C. The mixture is maintained at 250° C. for 5 hours. The vessel is cooled to prevailing atmospheric temperature, and the gaseous reaction products are released into an evacuated stainless steel cylinder which is cooled in liquid nitrogen. There is obtained 31 parts of condensed product which is shown by infrared absorption spectrometry to be a mixture of unreacted carbonyl fluoride and carbon dioxide. There remains in the reaction vessel 29 parts of a black liquid which is distilled through a conventional fractionating column to yield 16.88 parts of benzylidene difluoride, a water-white liquid, boiling at 35–36° C./15 mm. The identity of the compound is confirmed by its nuclear magnetic resonance spectrum.

B. The reaction of part A is repeated, employing twice the quantity of each reactant and a final heating period of 6 hours at 250° C. There is obtained 60 parts of reaction product from which 26.78 parts of benzylidene difluoride is obtained by fractional distillation.

C. The reaction of part A is repeated, except that the mixture is heated at 100° C. for 2 hours and at 150° C. for 10 hours. There is obtained 28 parts of liquid reaction product which is fractionally distilled to give 4.78 parts of benzylidene difluoride (about 18% conversion) boiling over a range of 42–80° C./38 mm.

D. The process of part C is repeated, except that about 1.0 part of pyridine is added as a catalyst. There is obtained from the crude liquid reaction product 18.77 parts of benzylidene difluoride (about 58% conversion) boiling at 52–59° C./40 mm.; $n_D^{25}$, 1.4580.

E. The reaction of part C is repeated, except that 1.0 part of triphenylphosphine oxide is added as a catalyst. There is obtained 11.5 parts of water-white benzylidene difluoride, boiling at 51–60° C./40 mm.; $n_D^{25}$, 1.4628–1.4750.

F. The reaction of part C is repeated, except that about 1.0 part of N,N-dimethylformamide is added as a catalyst. There is obtained 30 parts of crude liquid product which is treated with sodium fluoride and filtered. The filtrate is distilled to give 26 parts of water-white benzylidene difluoride, boiling at 55–62° C./50 mm.; $n_D^{25}$, 1.4562–1.4605. A part of the distilled material is treated with silica gel in a chromatographic column to remove traces of benzaldehyde, in the event this impurity is present. The purified product has a refractive index, $n_D^{25}$, of 1.4548.

*Analysis.*—Calcd. for $C_6H_5CHF_2$: F, 29.65. Found: F, 29.72.

G. A mixture of 27 parts of benzaldehyde, 8 parts of pyridine and 33 parts of carbonyl fluoride is heated as described in part C under autogenous pressure at 50° C. for 3 hours and at 100° C. for 8 hours. There is obtained a reaction product which is a mixture of benzylidene difluoride and α-fluorobenzyl fluoroformate.

EXAMPLE V

Using the procedure described in Example I, 27 parts of anisaldehyde and 33 parts of carbonyl fluoride are heated at 50° C. for 2 hours and 75° C. for 6 hours. There is obtained 27 parts of dark brown reaction product from which 2.36 parts of p-methoxybenzylidene difluoride is obtained by careful fractional distillation.

EXAMPLE VI

Using the procedure described in Example I-A, a mixture of 15 parts of p-dimethylaminobenzaldehyde and 25 parts of carbonyl fluoride is heated under autogenous pressure at 180° C. for 10 hours. There is obtained 8 parts of a tan-colored tacky product which is purified by extraction with ether to obtain crude p-dimethylaminobenzylidene difluoride.

The process of the invention, as described in the above examples, can be applied to formaldehyde which is obtained in situ by depolymerizing a polyoxymethylene. To illustrate, a mixture of 20 parts of α-polyoxymethylene and 60 parts of carbonyl fluoride is heated under autogenous pressure at 100° C. for 2 hours, 200° C. for 2 hours and 250° C. for 10 hours. There is obtained 39 parts of liquid reaction products which on distillation over sodium fluoride yield 23 parts of a water-white liquid, boiling 39–40° C., which consists of bis-fluoromethyl ether and fluoromethyl fluoroformate. The identity of the components in the reaction products is confirmed by infrared and nuclear magnetic resonance spectra. Difluoromethane is obtained from fluoromethyl fluoroformate by the process described earlier for fluorocyclohexyl fluoroformate.

Examples I–VI illustrate the invention in its application to oxo-compounds. The invention is generic to the reaction of carbonyl fluoride with such oxo-compounds, including not only those of the examples but also ketones in general and aldehydes in general. Thus, the oxo-compounds of the examples can be replaced by benzoquinone, sym-dichlorotetrafluoroacetone, furfural, methyl ethyl ketone, β-chloroethyl methyl ketone, cyclopentanone, p-fluoroacetophenone, p-methylcyclohexanone, methyl cyclohexyl ketone, propionaldehyde, isobutyraldehyde, valeraldehyde, dodecylaldehyde, acrolein, and the like.

EXAMPLE VII

A. Using the procedure described in Example I–A, a mixture of 20 parts of benzoic acid and 40 parts of carbonyl fluoride is heated under autogenous pressure at 300° C. for 8 hours. The reaction is exothermic and a spontaneous temperature rise occurs at 95–115° C. There is obtained 20 parts of a pale yellow liquid which is purified by treatment with sodium fluoride as previously described. Distillation of the product through an efficient fractionating column yields 14 parts of benzoyl fluoride, a water-white liquid boiling at 79–82° C./68 mm. The identity of the compound is confirmed by its nuclear magnetic resonance spectrum.

B. The reaction of part A is repeated employing 20 parts of benzoic acid, 40 parts of carbonyl fluoride and 5 parts of anhydrous hydrogen fluoride. The reaction mixture is heated at 350° C. for 10 hours. Upon treating the reaction mixture as described earlier, there is obtained by distillation 6.28 parts of a water-white liquid boiling at 40–83° C./100 mm. which is a mixture of benzotrifluoride and benzoyl fluoride. The two compounds can be separated by careful distillation through an efficient fractionating column.

C. The reaction of part B is repeated using 15 parts of boron trifluoride in place of the anhydrous hydrogen fluoride. There is obtained from the liquid reaction mixture by distillation about 13.5 parts of water-white liquid which is a mixture of benzotrifluoride and benzoyl fluoride.

D. A corrosion-resistant pressure vessel (capacity, 1000 parts of water) is charged with 244 parts of benzoic acid, 100 parts of sodium fluoride pellets and 160 parts of carbonyl fluoride. The reaction vessel is heated for 10 hours at 175° C. with agitation. The vessel is cooled and the non-volatile reaction products are rinsed with about 150 parts of pentane into a glass receiver. Pentane is removed by evaporation and the liquid residue is distilled under reduced pressure to yield 155.5 parts of benzoyl fluoride, a colorless liquid boiling at 65–67° C./30 mm.

EXAMPLE VIII

A corrosion-resistant pressure vessel (capacity, 500 parts of water) is charged with 100 parts of trifluoroacetic acid and 75 parts of carbonyl fluoride. The reaction mixture is heated under autogenous pressure with mechanical agitation for 6 hours at 150° C. The reaction vessel is cooled to about 25° C. and the gaseous reaction products are transferred to an evacuated stainless steel cylinder (capacity, 500 parts of water) which is cooled in liquid nitrogen. There is no solid or liquid residue in the reaction vessel. The gaseous reaction products are passed through pellets of sodium fluoride into a distillation flask which is cooled with liquid nitrogen. Low-temperature fractional distillation of the reaction products yields 79.2 parts boiling at −79° to −55° C. and 56.9 parts boiling at −55° to −50° C. The latter fraction (boiling −55° to −50° C.) is principally trifluoroacetyl fluoride (90+%  purity). Products in the lower boiling fraction (−79° to −55° C.) are carbon dioxide, unchanged carbonyl fluoride and an additional small amount of trifluoroacetyl fluoride.

EXAMPLE IX

A pressure vessel, of the type described in Example VIII, is charged with 214 parts of perfluorobutyric acid and 86 parts of carbonyl fluoride. The mixture is heated under autogenous pressure for 6 hours at 150° C. The gaseous reaction product (245.5 parts) is treated as described in Example VIII. There is obtained 144.3 parts of perfluorobutyryl fluoride, boiling at 5 to 7° C. This compound has the formula

EXAMPLE X

A reaction vessel, as described in Example VIII, is charged with 100 parts of perfluorooctanoic acid, 60 parts of sodium fluoride pellets, about 140 parts of pentane and 30 parts of carbonyl fluoride. The reaction mixture is heated under autogenous pressure for 10 hours at 150° C. The reaction products are transferred from the vessel to a fractional disillation unit and the reaction vessel is rinsed with about 140 parts of pentane to assure removal of all material. The wash liquid is combined with the original reaction mixture. The combined liquids are fractionally distilled to yield 67.6 parts of the acid fluoride, perfluorooctanoyl fluoride, boiling at 108–109° C. There is also obtained 13.7 parts of foreshots, boiling at 40–108° C., and 8.3 parts of high-boiling residue.

EXAMPLE XI

A corrosion-resistant pressure vessel (capacity, 1000 parts of water) is charged with 100 parts of perfluoroglutaric acid, 42 parts of sodium fluoride pellets, about 140 parts of pentane and 70 parts of carbonyl fluoride. The reaction mixture is heated under autogenous pressure with mechanical agitation at 175° C. for 15½ hours. The reaction products are worked up as described in previous examples and there is obtained the acid fluoride, perfluoroglutaryl fluoride, in good yield. Perfluoroglutaryl fluoride boils at 47–49° C.

EXAMPLE XII

A pressure vessel of the type described in Example XI is charged with 91 parts of perfluorosuccinic acid, 75 parts of sodium fluoride pellets, about 70 parts of pentane, 0.5 part of triethylamine and 122 parts of carbonyl fluoride. The mixture is heated under autogenous pressure at 175° C. for 11 hours. The reaction products are worked up as described in Example X, and there is obtained the acid fluoride, perfluorosuccinyl fluoride, in good yield. Perfluorosuccinyl fluoride boils at about 30–35° C.

Examples VII–XII illustrate the invention in its application to carboxylic acids. The invention is, in fact, generic to the reaction of carbonyl fluoride with carboxylic acids. Any carboxylic acid may be used, including difluoroacetic acid, trichloroacetic acid, butyric acid, caproic acid, stearic acid, acetone dicarboxylic acid, aconitic acid, adipic acid, suberic acid, hexahydrobenzoic acid, perfluroadipic acid, naphthalenedicarboxylic acid, acrylic acid, methacrylic acid, formic acid, terephthalic acid, and the like.

EXAMPLE XIII

Using the procedure of Example I-A, a mixture of 23 parts of phthalic anhydride, 50 parts of carbonyl fluoride and 2–3 parts of pyridine is heated under autogenous pressure at 100° C. for 2 hours, at 200° C. for 2 hours, at 300° C. for 2 hours, and at 350° C. for 8 hours. There is obtained 31.5 parts of a mixed liquid-solid product which is stirred into a slurry of 20 parts of sodium fluoride in about 90 parts of anhydrous ethyl ether. The mixture is filtered and the ether is removed from the filtrate by evaporation. The liquid residue is distilled under reduced pressure through an efficient fractionating column to yield 3.72 parts of a mixture of o-trifluoromethylbenzoyl fluoride and phthalolyl fluoride, boiling at 64–110° C./23 mm. There is also obtained 14 parts of a liquid boiling at 100° C./23 mm. to 98° C./9 mm. which is principally phthalolyl fluoride. This fraction solidifies on cooling.

Example XIII illustrates the reaction of carbonyl fluoride with another class of non-oxo-carbonylic compounds, the acid anhydrides. The invention is generic to the reaction of carbonyl fluoride with acid anhydrides, i.e., those having the —CO—O—CO— grouping, including acetic, propionic, methacrylic, maleic, succinic, and benzoic anhydrides and the like.

EXAMPLE XIV

A. A reaction vessel of the type described in Example I-A is charged with 25 parts of methyl benzoate and 35 parts of carbonyl fluoride, and the mixture is heated under autogenous pressure at 200° C. for 2 hours; at 250° C. for 2 hours; and at 300° C. for 10 hours. There is obtained 23 parts of a brown liquid which is distilled under reduced pressure through an efficient fractionating column to yield benzoyl fluoride.

B. The reaction of a part A is repeated using 25 parts of methyl benzoate, 35 parts of carbonyl fluoride and about 2 parts of N,N-dimethylformamide. The last compound is employed as a catalyst. The mixture is heated under autogenous pressure at 200° C. for 2 hours, at 250° C. for 3 hours and at 300° C. for 10 hours. There is obtained 25 parts of crude liquid porduct which is poured into a stirred slurry of 20 parts of sodium fluoride in 95–100 parts of pentane. The mixture is filtered, and the pentane is removed by exaporation of the filtrate. The liquid residue is fractionally distilled under reduced pressure to yield 12 parts of benzoyl fluoride, boiling at 47–58° C./20 mm. The identity of the compound is confirmed by the nuclear magnetic resonance spectrum.

C. The reaction of part A is repeated using 25 parts of methyl benzoate, 35 parts of carbonyl fluoride and about 2 parts of pyridine. The mixture is heated under autogenous pressure at 100° C. for 2 hours, at 150° C. for 2 hours and at 200° C. for 8 hours. Distillation of the liquid reaction product yields benzoyl fluoride.

Example XIV illustrates the invention as applied to carboxylic acid esters. The invention is generic to the reaction of carbonyl fluoride with carboxylic acid esters, including ethyl acetate, methyl formate, methyl butyrate, dimethyl adipate, diethyl succinate, dimethyl phthalate, phthalide, methyl oleate, cyclohexyl stearate, and the like. The acid fluorides obtained as one product can be converted to trifluoromethyl compounds by employing higher temperatures of reaction, as will be shown in the following examples.

EXAMPLE XV

Using the procedure of Example I-A, a mixture of 20 parts of benzoyl fluoride, 25 parts of carbonyl fluoride and 3 parts of boron trifluoride is heated at 350° C. for 10 hours. There is obtained 19 parts of liquid reaction products which are purified by treatment with a sodium fluoride slurry and by fractional distillation. There is obtained 0.55 part of benzotrifluoride, boiling at 89–91° C./100 mm. Approximately 15 parts of unreacted benzoyl fluoride is recovered.

Example XV illustrates the invention in its application to a further class of non-oxo-carbonylic compounds, the acid halides. The invention is generic to the reaction of carbonyl fluoride with acid halides having at most one halogen attached to carbonyl, including acetyl chloride, butyryl chloride, stearoyl chloride, adipyl bromide, chloroacetyl chloride, and the like. The acid fluorides of Examples VII–XII are converted to trifluoromethyl compounds by the procedure of Example XV.

The process of the invention is operable with carbonyl compounds which are a combination of acyl fluorides and amides or esters, i.e., amides and aryl esters of haloformic acids. To illlustrate, a mixture of phenyl fluoroformate (28 parts), carbonyl fluoride (30 parts) and cesium fluoride (2.7 parts) is heated under autogenous pressure at 250° C. for 2 hours, 300° C. for 2 hours and 350° C. for 10 hours and there is obtained 30 parts of a dark fuming liquid whose nuclear magnetic resonance spectrum shows it to contain a fluorinated ether.

EXAMPLE XVI

A. A corrosion-resistant pressure vessel (capacity, 500 parts of water) is charged with 30 parts of N-methylformamide, 42 parts of sodium fluoride and 33 parts of carbonyl fluoride. The reaction mixture is heated with agitation under autogenous pressure at 50° C. for 2 hours and at 75° C. for 1 hour. There is obtained a liquid reaction product which is fractionally distilled to yield 3 parts of N-methyl-N-difluoromethylcarbamyl fluoride, B.P. 78° C., and 17.5 parts of N-formyl-N-methylcarbamyl fluoride, boiling at 127–128.5° C. These products have the following formulae:

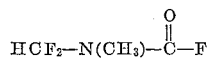

and

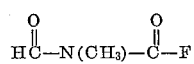

The identity of the products is confirmed by nuclear magnetic resonance and infrared spectra and by elemental analyses.

*Analysis.*—Calcd. for $C_3H_4F_3NO$: C, 28.35; H, 3.16; F, 44.88; N, 11.2. Found: C, 28.95; H, 4.13; F, 45.36; N, 10.47.

*Analysis.*—Calcd. for $C_3H_4FNO_2$: C, 34.29; H, 3.81; F, 18.10; N, 13.33. Found: C, 34.95; H, 4.27; F, 17.99; N, 13.08.

There is obtained in the above reaction 12 parts of gaseous by-products which are shown by infrared analysis to be about 50% $COF_2$ and 30–40% $CO_2$.

B. A pressure vessel of the type described in part A above is charged with 30 parts of N-methylformamide, 42 parts of sodium fluoride, and 80 parts of carbonyl fluoride. The mixture is heated with agitation under autogenous pressure for 1 hour from 25° C. to 230° C. The volatile by-products (27 parts) are separated by venting the reaction vessel into a cooled stainless steel cylinder. The liquid reaction products which remain are fractionally distilled to yield 10 parts of N-methyl-N-difluoromethylcarbamyl fluoride and 17 parts of N-formyl-N-methylcarbamyl fluoride.

EXAMPLE XVII

A. Using the procedure described in Example XVI, a mixture of 36 parts of N-methylacetamide, 42 parts of sodium fluoride and 66 parts of carbonyl fluoride is heated under autogenous pressure with agitation at 75° C. for 2 hours and at 125° C. for 2 hours. There is obtained 5 parts of N-(1,1-di-fluoroethyl)-N-methylcarbamyl fluoride, a water-white liquid boiling at 97–100° C. The identity of the compound is confirmed by infrared and nuclear magnetic resonance spectra and by elemental analysis. This compound has the following formula:

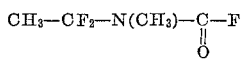

*Analysis.*—Calcd. for $C_4H_6F_3NO$: F, 40.45. Found: F, 40.44.

There is also obtained 13 parts of N-acetyl-N-methylcarbamyl fluoride, a water-white liquid, boiling at 120–138° C. Redistillation of this liquid yields a product, boiling at 136–138° C. This compound has the following formula:

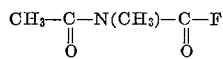

B. A mixture of 37 parts of N-methylacetamide and 33 parts of carbonyl fluoride is heated under autogenous pressure, as described in part A above, at 75° C. for 1 hour and at 125° C. for 1 hour. There is obtained 1.5 parts of N-(1,1-difluoroethyl)-N-methylcarbamyl fluoride and 9 parts of N-acetyl-N-methylcarbamyl fluoride, boiling at 135–138° C. The identity of the derivative is confirmed by infrared and nuclear magnetic resonance and by elemental analysis.

*Analysis.*—Calcd. for $C_4H_6FNO_2$: F, 15.97. Found: F, 15.91.

EXAMPLE XVIII

A. A corrosion-resistant pressure vessel (capacity, 300 parts of water) is charged with 36.5 parts of N,N-dimethylformamide (of which 2 parts is $C^{14}$ tagged carbonyl carbon) and 36 parts of carbonyl fluoride. The reaction mixture is maintained under autogenous pressure at 25° C. for 21 hours. Fractional distillation of the liquid reaction product yields 19 parts of dimethyldifluoromethylamine, a colorless fuming liquid boiling at 48–49° C. The product, which has the formula $HCF_2N(CH_3)_2$, contains 82.5% of the radioactive carbon present initialy in the N,N-dimethylformamide. The volatile by-products contained carbon dioxide in which 0.41% of radioactive carbon is present. These data demonstrate that the byproduct $CO_2$ is derived from the carbonyl fluoride.

B. A corrosion-resistant pressure vessel (capacity, 500 parts of water) is charged with 146 parts of N,N-dimethylformamide and 33 parts of carbonyl fluoride. The reaction mixture is maintained under autogenous pressure at 25° C. for 21 hours. There is obtained by fractional distillation of the reaction products 30 parts of dimethyldifluoromethylamine, boiling at 47–51.5° C. The identity of the compound is confirmed by the nuclear magnetic resonance spectrum.

EXAMPLE XIX

A corrosion-resistant pressure vessel (capacity, 500 parts of water) is charged with 40 parts of N,N-dimethylbenzamide and 25 parts of carbonyl fluoride. The mixture is heated under autogenous pressure with agitation at 50° C. for 1 hour. Volatile reaction products are separated by venting the reaction vessel, and the liquid reaction products are fractionally distilled to yield 33 parts of α,α-difluorobenzyldimethylamine, a water-white liquid boiling at 63° C./2 mm.

EXAMPLE XX

A corrosion-resistant pressure vessel (capacity, 500 parts of water) is charged with 36 parts of benzamide and 60 parts of carbonyl fluoride. The reaction mixture is heated under autogenous pressure at 75° C. for 1 hour and 150° C. for 1 hour. There is obtained by fractional distillation of the reaction product 12 parts of benzoyl fluoride, boiling at 155–161° C.

EXAMPLE XXI

Using the procedure of Example XX, a mixture of 40 parts of caprolactam, 66 parts of carbonyl fluoride, and 18 parts of cesium fluoride is heated under autogenous pressure at 79° C. for 1 hour and 125° C. for 1 hour. There is obtained 18 parts of N-fluoroformyl-1,1-difluorohexamethyleneimine, a water-white liquid boiling at 50° C./0.5 mm.

EXAMPLE XXII

Using the procedure of Example XX, a mixture of 44 parts of tetramethylurea and 30 parts of carbonyl fluoride is reacted under autogenous pressure at 50° C. for 1 hour and at 75° C. for 1 hour. There is obtained 5 parts of bis(dimethylamino)difluoromethane, i.e., $(CH_3)_2NCF_2N(CH_3)_2$ boiling at 101–103° C. The identity of the compound is confirmed by its nuclear magnetic resonance spectrum.

Examples XVI–XXII illustrate the invention in its application to another class of non-oxo-carbonylic compounds, namely, the carboxylic acid amides and ureas. The reaction is generic to the reaction of carbonyl fluoride with carboxylic acid amides and ureas, including acetamide, N-methylbutyramide, N,N-diethylstearamide, N,N-dimethylhexahydrobenzamide, phthalamide, and the like. The reaction is also generic to imides, e.g., succinimide and the like.

In the process as usually operated, the carbonyl fluoride is supplied performed as the reactant. However, the carbonyl fluoride can, if desired, be prepared in situ in the reaction chamber from the appropriate reactants. This mode of operation, which is included in the scope of the invention, is illustrated in Example XXIII which follows.

EXAMPLE XXIII

A. A corrosion-resistant pressure vessel (capacity 500 parts of water) is charged with 50 parts of phosgene, 60 parts of sodium fluoride and 214 parts of N,N-dimethylformamide. The mixture is maintained under autogenous pressure at 25° C. for 3 hours. The reaction vessel is connected to a stainless steel cylinder which is cooled in liquid nitrogen and the volatile reaction products (32 parts) are transferred to this cylinder. The liquid portion of the reaction products is separated and distilled to obtain 5.5 parts of dimethyldifluoromethylamine, a colorless fuming liquid, boiling at 48–50° C.

B. Corrosion-resistant pressure vessel (capacity 1000 parts of water) is charged with 100 parts of phosgene, 120 parts of sodium fluoride and 380 parts of N,N-dimethylformamide. The mixture is maintained under autogenous pressure with agitation at 25–30° C. for 3 hours. There is obtained 11.5 parts of dimethyldifluoromethylamine, boiling at 47–48° C. The identity of the product is confirmed by nuclear magnetic resonance and infrared spectra and by elemental analysis.

*Analysis.*—Calcd. for $C_3H_7NF_2$: F, 40.00; N, 14.72. Found: F, 39.42; N, 15.37.

In addition to its utility with the numerous compounds illustrated or mentioned above, the process of the invention is applicable to the metal salts of organic acids, particularly the alkaline and alkaline earth salts. For example, sodium benzoate can be used to obtain benzoyl fluoride and sodium propionate can be used to prepare propionyl fluoride.

Although carbonyl compounds free of reactive groups other than carbonyl are preferably used, compounds containing additional reactive groups are operable in the process but require additional quantities of carbonyl fluoride. Compounds containing unsaturation are also operable, e.g., methacrylic acid, propiolic acid, oleylamide, N,N-diethyl crotonic acid amide, and the like.

The reaction is applicable to polymers containing recurring carbonyl groups, for example, polyamides, polyesters and ethylene/carbon monoxide polymers of the type described in U.S. 2,495,286. To illustrate, 23 parts of a polyamide, obtained from adipic acid and hexamethylenediamine, and 40 parts of carbonyl fluoride are heated for 1 hour at 100° C. and 1 hour at 200° C. in a closed vessel under autogenous pressure to yield 32 parts of a soft, plastic fluorine-containing product. In like manner, 10 parts of ethylene/carbon monoxide copolymer (6.1/1 molar ratio), 20 parts of carbonyl fluoride, about 48 parts of benzene and about 1 part of dimethylformamide are heated in a closed vessel under autogenous pressure at 50° C. for 3 hours and at 75° C. for 10 hours. The crude product is poured into pentane and there is obtained a tough, rubbery, grayish-brown polymer containing 7.98% fluorine.

The fluorinated compounds obtained by the process of the invention are, in most cases, known compounds. Physically, they may be gases, liquid or solids which can be employed in a large number of fields. They can be used as gaseous or liquid carriers in aerosol sprays. They can be used as solvents and thinners in lacquers and paints. They are useful as liquid media for the preparation of dispersions of carbon black and graphite. They can also serve as intermediates in the preparation of other fluorine-containing compounds which are difficult to obtain.

In the reaction of carbonyl fluoride with aldehydes and ketones there is obtained a new class of compounds which are fluorine-bearing organic esters of fluoroformic acid in which the carbon bonded to the ester oxygen is also bonded to a fluorine atom. As noted above, this class of compounds can be represented generically by the following formula:

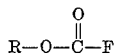

where R is an organic group bearing a fluorine on the carbon bonded to the ester oxygen. This formula can be written more specifically as

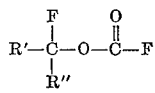

where R′ and R″ preferably contain up to 17 carbons and are, individually, hydrogen, alkyl, haloalkyl, aryl, haloaryl, alkoxy-substituted aryl or dialkylamino-substituted aryl or, jointly, alkylene of 3–5 carbons, any halogen present being chlorine or fluorine.

The class of compounds is illustrated, for example, by the α-fluorocyclohexyl fluoroformate of Example I. Other examples of this novel class of compounds, and the carbonyl reactants from which they are obtained by reaction with carbonyl fluoride, are α-fluoroethyl fluoroformate from acetaldehyde, 2-fluoro-2-propyl fluoroformate from acetone, α-fluorocyclopentyl fluoroformate from cyclopentanone, α-fluorododecyl fluoroformate from dodecanal, α-fluorobenzyl fluoroformate from benzaldehyde, α-fluoro-α-phenylethyl fluoroformate from acetophenone, diphenylfluoromethyl fluoroformate from benzophenone, α-fluorooctadecyl fluoroformate from octadecanal, and 2-fluoro-2-butyl fluoroformate from methyl ethyl ketone.

These compounds are generally liquids or low-melting solids which are stable at ordinary atmospheric temperature and pressure. The compounds will decompose when heated, especially in the presence of a catalyst, to form valuable fluorinated products which contain a difluoromethylene group.

The esters of fluoroformic acid are generically useful as solvents for highly fluorinated polymers, e.g., the fluorinated olefin polymers. Solutions of such polymers, e.g., poly(tetrafluoroethylene), poly(chlorotrifluoroethylene), and the like, in the ester of fluoroformic acid, are useful in making cellulosic compositions waterproof. To illustrate, a 1% by weight solution of a low molecular weight, low melting tetrafluoroethylene polymer (melting range 83–150° C.) is prepared by warming the polymer in α-fluorocyclohexyl fluoroformate until the polymer dissolves. Strips of cellulose filter paper are immersed in the warm solution for 0.5–1.0 minute. The strips are removed, washed thoroughly with pentane, and dried in air. The treated filter paper is not wet by drops of water, whereas an untreated control paper is immediately and completely wetted by water.

The carbamyl fluorides which are obtained by the process of the invention, as illustrated in Examples XVI, XVII and XXI, are also useful as solvents for highly fluorinated polymers as described in the preceding paragraph. To illustrate, a clear solution of low molecular weight, low melting tetrafluoroethylene polymer is obtained by warming the polymer in N-acetyl-N-methylcarbamyl fluoride. Cellulose filter paper which is treated with this solution is water repellent.

Dimethyldifluoromethylamine, which is obtained by the process of the invention as illustrated in Example XVIII, is valuable as a treating agent for cellulosic products. For example, a strip of cellulose filter paper is immersed for 2 hours at 25° C. in dimethyldifluoromethylamine. The paper is removed and it is dried in air. The treated paper is water repellent and it has a harder surface and a higher wet-strength than an untreated control paper.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process for the preparation of an organic fluorine compound which comprises fluorinating with carbonyl fluoride, at a temperature in the range of about 0–700° C. and under substantially anhydrous conditions, an organic compound containing oxygen doubly bonded to carbon, said carbon being further joined by single bonds to two atoms of which at most one is halogen and at most one is oxygen.

2. The process of claim 1 wherein the carbonyl fluoride is generated in situ.

3. The process of claim 1 wherein the organic compound is an oxo-carbonylic compound.

4. The process of claim 1 wherein the organic compound is a non-oxo-carbonylic compound.

5. The process of claim 1 accomplished in the presence of a catalyst selected from the group consisting of tertiary amines, N,N-dialkylcarboxylic amides, inorganic fluorides and phosphine oxides.

6. The process for the preparation of an organic fluorine compound which comprises fluorinating a ketone with carbonyl fluoride at a temperature in the range of about 0–700° C. and under substantially anhydrous conditions.

7. The process for the preparation of an organic fluorine compound which comprises fluorinating cyclohexanone with carbonyl fluoride at a temperature in the range of about 0–700° C. and under substantially anhydrous conditions.

8. The process for the preparation of an organic fluorine compound which comprises fluorinating an aldehyde with carbonyl fluoride at a temperature in the range of about 0–700° C. and under substantially anhydrous conditions.

9. The process for the preparation of an organic fluorine compound which comprises fluorinating benzaldehyde with carbonyl fluoride at a temperature in the range of about 0–700° C. and under substantially anhydrous conditions.

10. The process for the preparation of an organic fluorine compound which comprises fluorinating a carboxylic acid with carbonyl fluoride at a temperature in the range of about 0–700° C. and under substantially anhydrous conditions.

11. The process for the preparation of an organic fluorine compound which comprises fluorinating benzoic acid with carbonyl fluoride at a temperature in the range of about 0–700° C. and under substantially anhydrous conditions.

12. The process for the preparation of an organic fluorine compound which comprises fluorinating an anhydride of a carboxylic acid with carbonyl fluoride at a temperature in the range of about 0–700° C. and under substantially anhydrous conditions.

13. The process for the preparation of an organic fluorine compound which comprises fluorinating phthalic anhydride with carbonyl fluoride at a temperature in the range of about 0–700° C. and under substantially anhydrous conditions.

14. The process for the preparation of an organic fluorine compound which comprises fluorinating a carboxylic acid ester at a temperature in the range of about 0–700° C. and under substantially anhydrous conditions.

15. The process for the preparation of an organic fluorine compound which comprises fluorinating methyl benzoate with carbonyl fluoride at a temperature in the range of about 0–700° C. and under substantially anhydrous conditions.

16. The process for the preparation of an organic fluorine compound which comprises fluorinating a halide of a carboxylic acid having at most one halogen attached to carbonyl with carbonyl fluoride at a temperature in the range of about 0–700° C. and under substantially anhydrous conditions.

17. The process for the preparation of an organic fluorine compound which comprises fluorinating a carboxylic acid amide with carbonyl fluoride at a temperature in the range of about 0–700° C. and under substantially anhydrous conditions.

18. The process for the preparation of an organic fluorine compound which comprises fluorinating a urea with carbonyl fluoride at a temperature in the range of about 0–700° C. and under substantially anhydrous conditions.

19. The process for the preparation of an organic fluorine compound which comprises fluorinating a polymer containing a recurring carbonyl group with carbonyl fluoride at a temperature in the range of about 0–700° C. and under substantially anhydrous conditions.

20. α-Fluorobenzyl fluoroformate.

21. 1-fluorocyclohexyl fluoroformate.

References Cited by the Examiner

UNITED STATES PATENTS

| 2,377,085 | 5/45 | Kung | 260—77.5 |
| 2,440,090 | 4/48 | Howk | 260—77.5 |
| 2,709,189 | 5/55 | Farlow et al. | 260—653 |
| 2,836,622 | 5/58 | Tullock | 260—544 |
| 2,894,996 | 7/59 | Farlow et al. | 260—653 |

OTHER REFERENCES

Emeleus et al.: Journal Chemical Society, pp. 2183–8 (1948).

Fukuhara et al.: Journal American Chemical Society, vol. 63, pp. 788–91 (1941).

Glemser et al.: C.A. 4282, vol. 51 (1957).

Holub et al.: Journal American Chemical Society, vol. 72, pp. 4879–84 (1950).

Kitano et al.: Chemical Abstracts, vol. 50, pp. 11262–3 (1956).

LEON J. BERCOVITZ, *Primary Examiner.*

MILTON STERMAN, HAROLD N. BURSTEIN, JOSEPH R. LIBERMAN, *Examiners.*